Figures 4, 5:
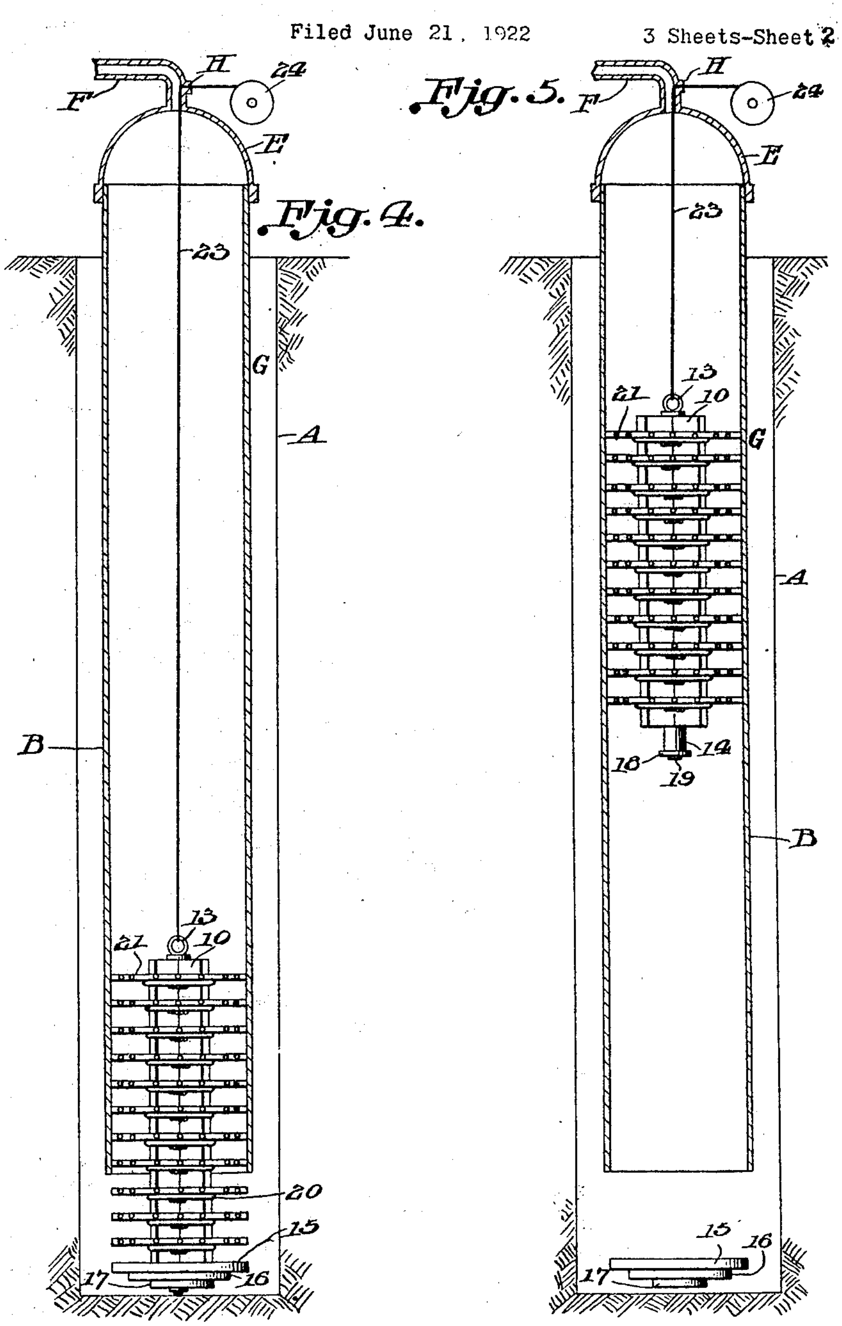

8 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

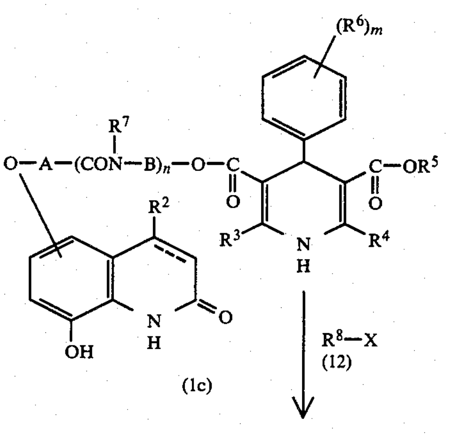

(1c)

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful $$v'_{ref}(t) = K\,r\,\delta\left(t - \frac{2L - 2d_s}{v_w}\right) + K(1 - r^2)e^{-2\alpha s d_s}$$

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful $$\cos\beta^* = \frac{K_2 - n\frac{T'}{v''}}{\sqrt{K_1^2 + \left(K_2 - n\frac{T'}{v''}\right)^2 + K_3^2}}$$

$$(K_1x+K_2y+K_3z+T)+n(K''_1x+K''_2y+K''_3z+T'')=0$$

8 PT.

...are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

6 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

4 PT.

Carbostyril derivative or a pharmaceutically acceptable acid addition salt thereof, having excellent platelate aggregation inhibitory effect, calcium antagonism, hypotensive effect and phosphodiesterase inhibitory effect are useful as prophylactic or treating agents for thrombosis, circulation improving agents for coronary blood flow such as coronary vasodilators, hypotensive agents and phosphodiesterase inhibitors. Furthermore, the carbostyril derivatives are weak in heart rate increasing activity and also in cardiac muscle contraction increasing activity, and the carbostyril derivatives are useful

| $r_1$ ($L_1$) | $r_6$ ($L_3$) | $r_7$ ($L_4$) |
|---|---|---|
| K = 1.0 | K = 1.0 | K = 0.0 |
| $C_2$ = 0.0 | $C_2$ = 0.0 | $C_2$ = 0.0 |
| $C_4$ = −0.15691 × 10−6 | $C_4$ = +0.95381 × 10−7 | $C_4$ = −0.22891 × 10−5 |
| $C_6$ = −0.40068 × 10−10 | $C_6$ = −0.73871 × 10−10 | $C_6$ = +0.12283 × 10−9 |
| $C_8$ = +0.21016 × 10−13 | $C_8$ = +0.12280 × 10−13 | $C_8$ = +0.84230 × 10−13 |
| $C_{10}$ = −0.37685 × 10−17 | $C_{10}$ = −0.33177 × 10−17 | $C_{10}$ = −0.20592 × 10−16 |

$f_1$ = 314.6
$f_2$ = 88.0
$f_3$ = −481.2
$f_4$ = −99.6

100mm

2

= 101.2 Aperture ratio: 1:1.10
Iagnification of projection: −7.997x
Ialf angle of view: 28.56°

| | | | |
|---|---|---|---|
| 143.454 | $d_1$ = 11.0 | $n_1$ = 1.49380 | $L_1$ |
| −1542.254 | $d_2$ = 68 | | |
| 116.976 | $d_3$ = 20.0 | $n_2$ = 1.62286 | $L_2$ |
| 110.914 | $d_4$ = 2.87 | | |
| −89.375 | $d_5$ = 5.0 | $n_3$ = 1.59501 | $L_3$ |
| −127.071 | $d_6$ = 58.8 | | |
| −48.609 | $d_7$ = 5 | $n_4$ = 1.49380 | $L_4$ |
| ∞ | | | |
| ∞ | $d_8$ = 5 | $n_5$ = 1.45000 | S |
| ∞ | $d_9$ = 8 | $n_6$ = 1.51872 | G |

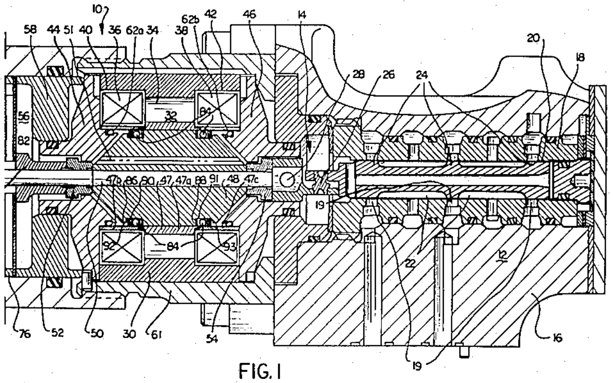
FIG. 1

IMAGE SYSTEM
TEST TARGET
A
U.S. DEPARTMENT OF COMMERCE
PATENT AND TRADEMARK OFFICE

73. MEASURING & TESTING.

151

Draftsman's Co

July 3, 1923. 1,460,436

T. R. NICHOLS

COMBINED INDICATOR AND GAUGE

Filed June 21, 1922 3 Sheets-Sheet 2

T. R. Nichols
INVENTOR

Witness: C. W. Markward

BY Victor J. Evans
ATTORNEY

73. MEASURING & TESTING.

151

Draftsman's Copy

July 3, 1923. 1,460,436

T. R. NICHOLS

COMBINED INDICATOR AND GAUGE

Filed June 21, 1922 3 Sheets-Sheet 3

T. R. Nichols
INVENTOR

C.W. Markward
WITNESS:

BY Victor J. Evans
ATTORNEY

Draftsman's Copy

Patented July 3, 1923. 1,460,436

UNITED STATES PATENT OFFICE.

TROY R. NICHOLS, OF MEXIA, TEXAS.

COMBINED INDICATOR AND GAUGE.

Application filed June 21, 1922. Serial No. 569,795.

*To all whom it may concern:*

Be it known that I, TROY R. NICHOLS, a citizen of the United States, residing at Mexia, in the county of Limestone and State of Texas, have invented new and useful Improvements in Combined Indicators and Gauges, of which the following is a specification.

This invention relates to oil well apparatus and has for its object the provision of a novel device designed to be inserted into a well casing for a purpose of ascertaining the condition of the casing, that is for determining whether or not the casing has become mashed or collapsed at any point or whether it has parted, the device further operating when used in conjunction with a measuring line, to enable the operator to know definitely at what depth the collapsing or parting has occurred.

An important object is the provision of a device of this character which also gives definite data as to whether or not the casing is in condition to be cemented and also indications as to what type of swaging tool should be used for straightening the casing in the event that it has become mashed or collapsed to a greater or less extent at any point or points.

An additional object is the provision of a device of this character which will be simple and inexpensive in manufacture, easy to use, efficient and durable in service and a general improvement in the art.

Figures 6, 7, 8:
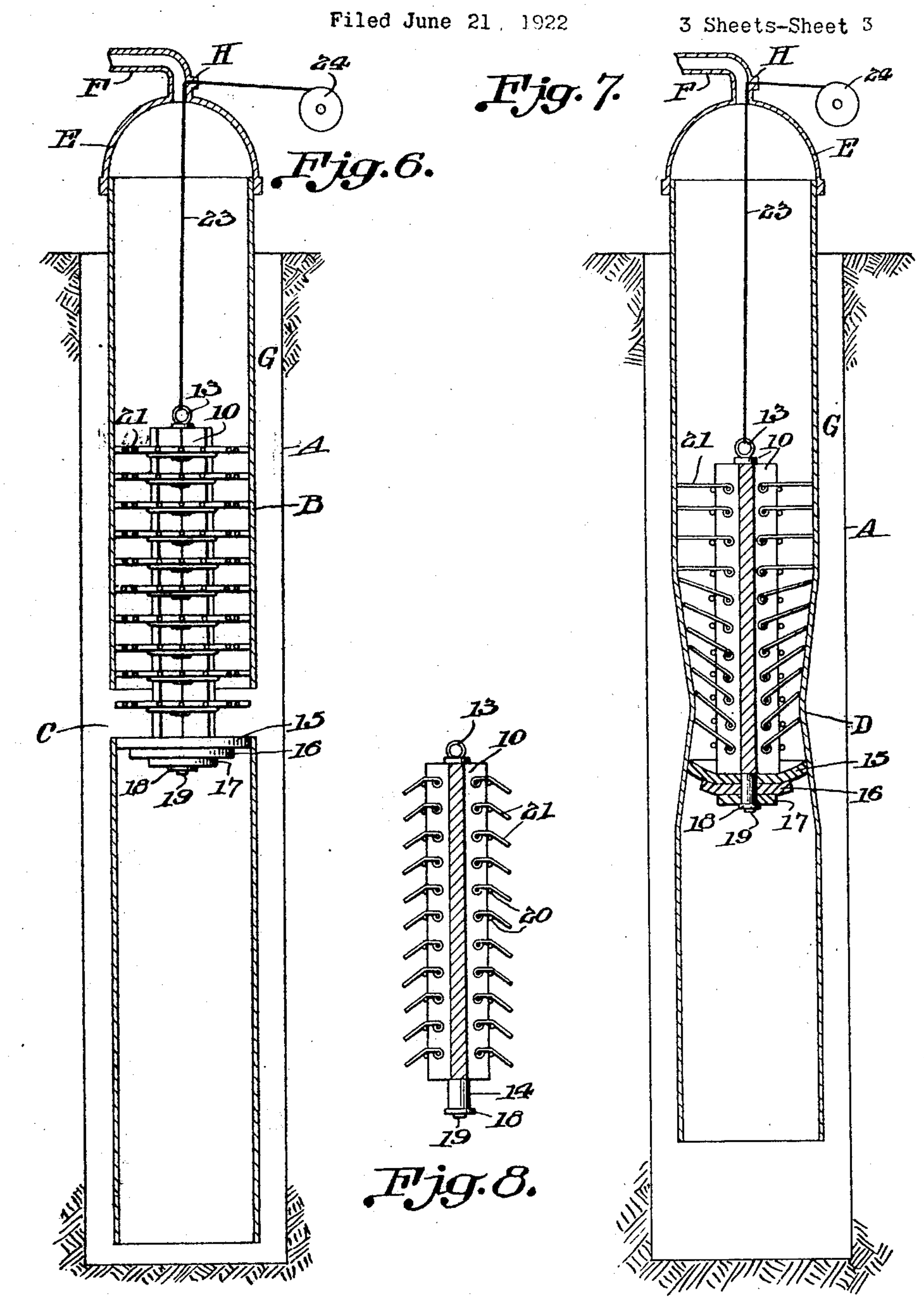

With the above and other objects and advantages in view the invention consists in the details of construction to be hereinafter more fully described and claimed and illustrated in the accompanying drawings in which:

Figure 1 is a longitudinal section through my device on a rather large scale to illustrate the construction, Figure 2 is a plan view, Figure 3 is a cross section, Figure 4 is a longitudinal section through a normal well casing showing my device inserted therein and moved to the bottom thereof, Figure 5 is a similar view showing the device as subsequently pulled up and leaving the disks at the bottom of the well, Figure 6 is a similar view showing the action of the device in the event that the casing has become parted, Figure 7 is a longitudinal section through a well in which the casing has collapsed, this view showing my device in the act of passing through the collapsed portion and Figure 8 is a view of the device alone subsequent to its removal from the collapsed casing.

Referring more particularly to the drawings I have shown my device as comprising an elongated upright frame 10 which in actual practice is cruciform in cross section as shown and formed from a relatively wide board 11 to opposite sides of the center of which are secured boards 12 which are each less than one-half the width of the board 11, the securing together being effected by means of nails, screws, or bolts. At its upper end this frame carries a suspension element 13 while its lower end is formed with a reduced cylindrical extension 14 upon which are engaged disks 15, 16 and 17 of rubber, felt or the like which are of progressively decreasing diameters and which are naturally flexible and held in place by a washer 18 secured to the extension 14 by means of a nail 19 or the like. The diameter of the disk 15 is such that it will fit snugly within the well casing in which the device is to be used.

Secured to this frame are wire members 20 which are secured to the edges of the boards 11 and 12 by means of staples or the like and which operate as braces for a plurality of wire arms 21 which extend radially from the frame and which have their inner ends secured at the junctures of the boards 12 with the board 11 as shown at 22. Normally these wire arms 21 extend outwardly at right angles to the longitudinal axis of the frame in engagement with the tops or upper edges of the brace wires 20 as clearly shown in Figure 1.

The use of the device is as follows: The letter A designates a well within which is a casing to be tested. In Figures 4 and 5 this casing B is represented as being in normal condition while in Figure 6 the casing is represented as being parted or broken at the point C while in Figure 7 the casing is collapsed or mashed at the point D. In using my device the top of the casing B is closed by a connection E with which is connected a pipe F through which is pumped water which passes down through the casing B to the bottom of the well and up through the space G between the wall of the well and the casing, the water eventually overflowing at the top of the well. This operation establishes circulation in the well. My device is then inserted at the top of the casing and is suspended from a measuring line 23 which passes through a suitable packing gland H in the pipe F and which is wrapped upon a suitable spool 24. After the device is inserted within the casing water is pumped through the pipe F and the pressure thereof will operate to force my device downwardly to the bottom of the well. If the casing is in normal condition as shown in Figure 4 the device will pass freely downwardly until the disks 15, 16 and 17 pass beyond the bottom of the casing whereupon the water will flow out of the bottom of the casing and upwardly through the space G and overflow at the top of the well. The length of measuring line 23 paid out during the downward movement of the device will apprise the operator as to whether or not the device has really reached the bottom of the casing as the length of the casing is of course a known quantity. When the device is substantially pulled up the disks 15, 16, 17 and the washer 18 carrying the nail 19 will be pulled off from the frame and will remain at the bottom of the well as shown in Figure 5.

In the event that the casing has become parted or broken, as indicated in Figure 6, when the device is inserted in the casing and forced down by the water pressure, upon reaching the point C where the part or break occurs the water behind the device will escape through the opening and pass up through the space G and overflow at the top of the well. The disk 15 will of course seat upon the top of that portion of the casing which is below the point of parting. When the water overflows the top and the disk 15 seats as just described the operator may ascertain by inspecting the measuring line 23 the depth to which the device has descended and will thus know just exactly where the break or parting occurs. In cases like this it is necessary to pull the casing and make the necessary repairs before the well can be cemented.

It frequently occurs that the casing collapses or becomes mashed as shown at D in Figure 7. When my device is forced down in a casing which is in this condition, upon reaching the constricted portion D the wires 21 will swing upwardly as shown in Figure 7 and permit the device to be forced down to the bottom of the casing, the flexibility of the disks 15, 16 and 17 permitting the action. When the device has reached the bottom of the casing and is then pulled up the wires 21 upon passing the constricted portion D will be positively bent downwardly owing to the fact that on this reverse pull they engage the brace members 20. When the device reaches the top of the casing and is pulled out the operator will know at a glance from the bent condition of the wire arms 21 that the casing is mashed or collapsed at some point and by measuring the diameter of the device between any two opposite ones of the bent arms 21, the exact degree of collapsing may be definitely known. From this data the operator will know what type of swaging tool should be used for straightening the casing so that it will be in proper condition for cementing.

From the foregoing description and a study of the drawings it will be apparent that I have thus provided a simple and consequently inexpensive device which will be a manifest utility in ascertaining the exact condition of well casings so that it will be known whether or not the casing is in proper condition to permit cementing of the well in the usual manner.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. An indicator and gauge for wells comprising a frame, a measuring line connected with the frame and carried by a paying out spool for measuring the depth to which the device descends within a well casing, a flexible disk detachably connected with the lower end of the frame, and a plurality of bendable arms extending radially from the frame and engaging the inner periphery of the casing.

2. An indicator and gauge for wells comprising a frame, a measuring line connected with the frame and carried by a paying out spool for measuring the depth to which the device descends within a well casing, a flexible disk detachably connected with the lower end of the frame, and a plurality of bendable arms extending radially from the frame and engaging the inner periphery of the casing, the disk fitting snugly within the casing so as to be pulled off by the lower end of the casing when the device has been lowered beyond the bottom of the casing and subsequently pulled up.

3. An indicator and gauge for wells comprising a frame, a measuring line connected with the frame and carried by a paying out spool for measuring the depth to which the device descends within a well casing, a flexible disk detachably connected with the lower end of the frame, and a plurality of bendable arms extending radially from the frame and engaging the inner periphery of the casing and brace members carried by the frame and engaging beneath said bendable arms for effecting permanent bending thereof when the device is pulled up after being Draftsman's Copy.

lowered through a casing mashed at a point.

4. A device of the character described comprising a frame cruciform in cross section and provided with suspension means, a measuring line secured to said suspension means whereby to lower the device into a well casing, flexible disks detachably mounted upon the lower end of the frame and fitting snugly within the well casing to be tested and adapted to be pulled off when the device is subsequently pulled up out of the casing, a plurality of brace wires secured in spaced vertical relation to the edges of the frame, and a plurality of bendable wire arms secured to the junctures of the arms of the cruciform frame and engaging upon said brace wires, the ends of all of said wire arms engaging against the inner periphery of the well casing within which the device is inserted.

TROY R. NICHOLS.